United States Patent
Sedeffow (10) Patent No.: US 8,363,715 B2
(45) Date of Patent: Jan. 29, 2013

(54) PROCESSING COMPRESSED VIDEO DATA

(75) Inventor: Peter Vassilev Sedeffow, London (GB)

(73) Assignee: Saffron Digital Limited, London (GB)

( * ) Notice: Subject to any disclaimer, the term of this patent is extended or adjusted under 35 U.S.C. 154(b) by 1055 days.

(21) Appl. No.: 12/112,238

(22) Filed: Apr. 30, 2008

(65) Prior Publication Data

US 2008/0273593 A1 Nov. 6, 2008

(30) Foreign Application Priority Data

May 2, 2007 (GB) ................................. 0708440.3
May 10, 2007 (GB) ................................. 0709009.5

(51) Int. Cl.
H04N 7/12 (2006.01)

(52) U.S. Cl. .................. 375/240.01; 370/235; 375/240; 375/240.25; 382/232

(58) Field of Classification Search .................. None
See application file for complete search history.

(56) References Cited

U.S. PATENT DOCUMENTS

| | | | |
|---|---|---|---|
| 5,592,226 A | 1/1997 | Lee et al. | |
| 6,976,151 B1* | 12/2005 | Overkamp et al. | 712/209 |
| 7,424,160 B1* | 9/2008 | Basse | 382/236 |
| 2002/0097750 A1* | 7/2002 | Gunaseelan et al. | 370/503 |
| 2003/0007558 A1 | 1/2003 | Vetro et al. | |
| 2003/0067981 A1 | 4/2003 | Zhao et al. | |
| 2004/0255139 A1 | 12/2004 | Giobbi | |
| 2005/0278794 A1 | 12/2005 | Leinonen et al. | |
| 2006/0056508 A1 | 3/2006 | Lafon et al. | |
| 2006/0095942 A1 | 5/2006 | van Beek | |
| 2006/0154648 A1 | 7/2006 | Oh et al. | |
| 2006/0190410 A1 | 8/2006 | Harper | |
| 2006/0268933 A1* | 11/2006 | Kellerer et al. | 370/469 |
| 2007/0002946 A1* | 1/2007 | Bouton et al. | 375/240.01 |
| 2007/0094691 A1* | 4/2007 | Gazdzinski | 725/62 |
| 2007/0098162 A1 | 5/2007 | Shin | |
| 2007/0271106 A1 | 11/2007 | Lee et al. | |

FOREIGN PATENT DOCUMENTS

| | | |
|---|---|---|
| EP | 1596594 | 11/2005 |
| EP | 1659736 | 5/2006 |
| EP | 1732333 | 12/2006 |
| EP | 1770957 | 4/2007 |
| JP | 2003-299064 | 10/2003 |
| JP | 2005-260541 | 9/2005 |

(Continued)

OTHER PUBLICATIONS

Real—"Delivering Total Mobile TV: Combining Streaming and Broadcast for a Complete Mobile Television Solution"; C. Steck http://docs.real.com/industries/DeliveringTotalMobileTV.pdf. Dated Apr. 2006. Rev. 1.0.2, 12 pages (emphasizing p. 9).

*Primary Examiner* — Ayaz Sheikh
*Assistant Examiner* — Nicholas Sloms
(74) *Attorney, Agent, or Firm* — Harness, Dickey & Pierce, P.L.C.

(57) ABSTRACT

Video data is compressed for streaming to mobile devices. The data includes spatially compressed frames (I frames) followed by a plurality of temporally compressed frames (P frames) a source of input video data is coded to produce compressed data having I frames and P frames. The data volume of the I frames is compared with that of the P frames. In response to the data volume of the I frames being too large when compared to the data volume of the P frames, the input video data is coded again to produce I frames having a smaller data volume.

14 Claims, 12 Drawing Sheets

FOREIGN PATENT DOCUMENTS

| | | |
|---|---|---|
| JP | 2005-311459 | 11/2005 |
| WO | WO 97/04585 | 2/1997 |
| WO | WO 00/18137 | 3/2000 |
| WO | WO 2005/083917 | 9/2005 |
| WO | WO 2006/077526 | 7/2006 |

* cited by examiner

PROCESSING COMPRESSED VIDEO DATA

CROSS REFERENCE TO RELATED APPLICATIONS

This application claims priority from United Kingdom Patent Application Number 0708440.3. filed 2 May 2007 and United Kingdom patent application number 0709009.5 filed 10 May 2007, the entire disclosure of which are incorporated herein by reference in their entirety.

BACKGROUND OF THE INVENTION

1. Field of the Invention

The present invention relates to processing compressed video data for streaming to mobile devices.

2. Description of the Related Art

The streaming of video data over the internet is known, in which compressed video is broken into packets, transmitted over the network and then reassembled at a browser. In order to display high quality video images at the browser, data packets are buffered, reassembled and the video information is then decoded.

Increasingly, substantial bandwidth is available over internet connections and browsing systems generally have large storage capacities and substantial processing facility. In mobile devices, all of these parameters are restricted, particularly transmission bandwidth.

A problem occurs with known streaming approaches in that the nature of video compression often results in very large frames being followed by a substantial number of much smaller frames. Thus, when streaming such frames over a transmission channel of limited bandwidth (or of limited digital baud rate) potential transmission bandwidth may be wasted while the system waits for the next available highly compressed frame. Under these circumstances, it is possible that less than optimum video signals will be coded and decoded than what would be possible were the transmission bandwidth to be more closely optimised.

BRIEF SUMMARY OF THE INVENTION

According to an aspect of the present invention, there is provided a method of processing compressed video data for streaming to mobile devices, wherein said data includes spatially compressed frames (I frames) followed by a plurality of temporally compressed frames (P frames), comprising the steps of: coding a source of input video data to produce compressed data having I frames and P frames; comparing the data volume of I frames and P frames; and in response to the data volume of the I frames being too large when compared to the data volume of the P frames, coding the input video data again to produce I frames having a smaller data volume.

In a preferred embodiment, the recoding step is performed again to produce I frames having a smaller data volume until the ratio of I frame data volume to P frame data volume has dropped below a predetermined maximum value. Preferably, the average data volume of the I frames is compared to the average data volume of the P frames.

DESCRIPTION OF THE BEST MODE FOR CARRYING OUT THE INVENTION

Figure 1:
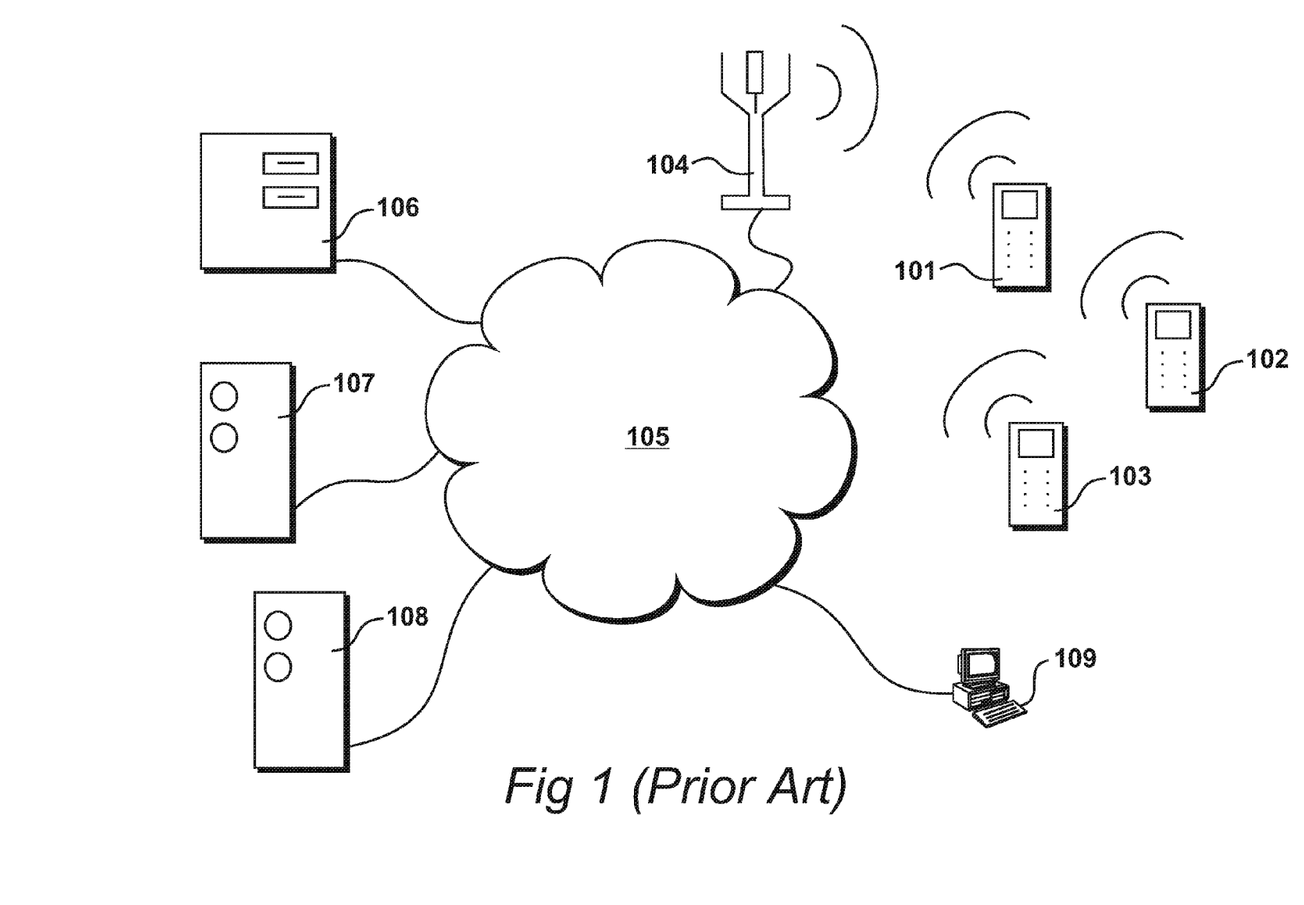
FIG. 1 shows an environment having mobile devices.

FIG. 1 shows an environment in which video data may be streamed to mobile devices. Typical mobile devices are illustrated at 101, 102 and 103. The mobile devices may be mobile cellular telephones but alternatively they could be personal digital assistants, gaming consoles or ultra mobile personal computers or any other type of mobile device fitted with mobile telephony.

Mobile devices 101 to 103 communicate with the base station 104, that in turn communicates with a network 105. Network 105, shown in FIG. 1, represents all relevant interconnected networks including private exchanges and the Internet etc. The mobile devices 101 to 103 execute wireless applications and as such communicate with a wireless applications protocol (WAP) server 106. Server 106 is responsible for serving many types of wireless applications to the mobile devices and the present embodiment is concerned with the streaming of video material, including feature length productions. Traditionally, material of this type has not been streamed to mobile communications devices for many reasons, including poor viewing quality.

Video material is stored in compressed form on video servers, including video server 107 and video server 108. Servers 107 and 108 could be administered by totally independent organisations, each having access to particular legally protected assets. Each asset may be identified by a resource locator and the video material itself is provided to the requesting mobile devices using real-time streaming protocol (RTSP).

When a mobile device, such as device 101 has been provided with the details of an asset location, it is possible for the mobile device itself to issue commands to the appropriate server resulting in the information being streamed. However, in most networks, the total amount of available bandwidth is limited and this limitation in itself, irrespective of the capabilities of the device, will place restrictions on the amount of data that may be streamed and will ultimately result in a degradation of spatial quality.

In order for video data to be streamed to mobile devices, it is necessary to perform data compression upon the video images. Many video compression techniques are known, predominately developed for broadcast purposes and for file download purposes. It is known to download complete files to mobile devices using compression techniques. However, the present applicant has appreciated that compression procedures optimised for file download may result in less than optimum performance when used for streaming.

Figure 2:
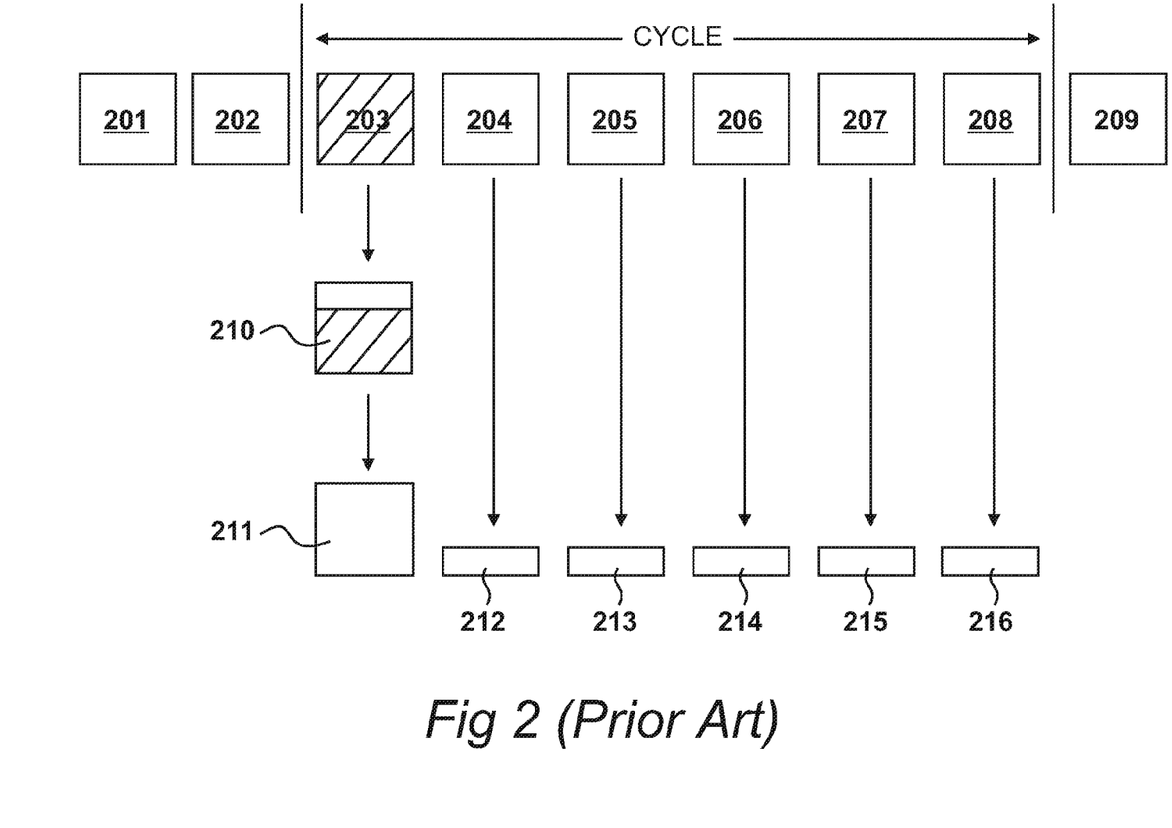
FIG. 2 illustrates a typical process for the compression of video data.

FIG. 2 illustrates a typical process for the compression of video data. A video clip is represented by uncompressed video frames 201 to 209. The compression technique identifies a cycle of frames which in this example is represented by frame 203 to frame 208, that is a total of 6 frames. However, it should be appreciated that many cycles include many more frames and the example shown in FIG. 2 is put forward for illustration only.

The first frame in the cycle, frame 203 is selected and processed to produce a spatially compressed frame 210. The spatially compressed frame is produced by identifying tiles of pixels within the image frame and performing a discrete cosine transform algorithm upon them; effectively transforming intensity values to frequency values. This results in a level of data compression. Furthermore, a greater level of compression may be obtained by a further truncation process resulting in a further compressed frame 211 which is now taken as the first frame in the compressed cycle.

With reference to frame 211, subsequent frames in the cycle, namely frames 204 to 208 are compressed to an even higher degree by effectively performing similar transforms and then comparing values with respect to the previous frame. Thus, by these processes of spatial and temporal compression it is possible to produce highly compressed frames within the cycle, namely frames 212, 213, 214, 215 and 216. In many compression procedures of this type, frames that have been compressed spatially, namely frames 210 and 211, are referred to as I frames. The subsequent frames within the cycle that have also undergone temporal compression are referred to as P frames.

The present applicant has appreciated that the size of the P frame (frames 212 to 216) may be reduced significantly if their proceeding I frame is maintained to a very high spatial quality. This will result in the size of the I frame being relatively large but in terms of the total size of the data, the overall size will be reduced because the following P frames become very small.

Figure 3:
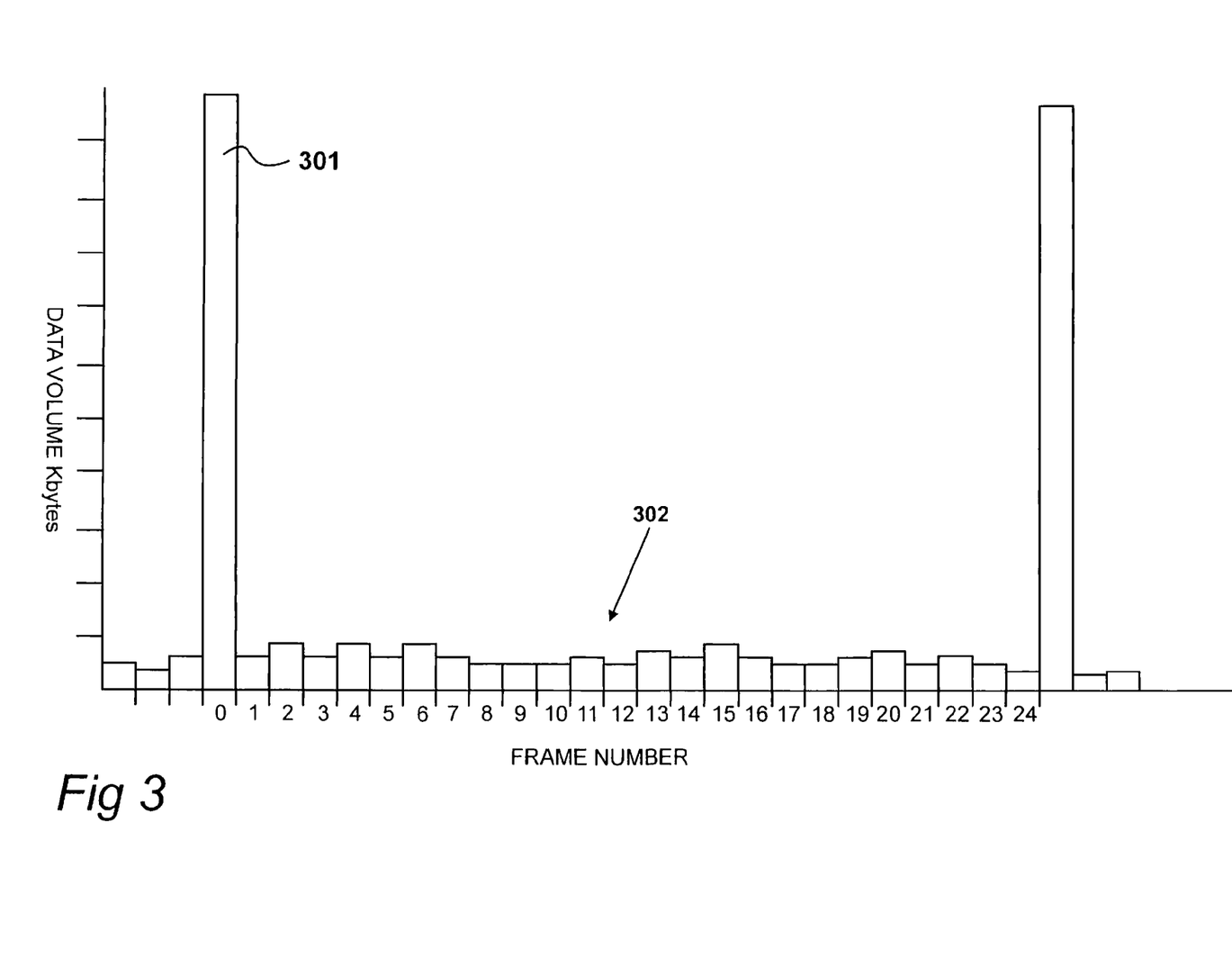
FIG. 3 shows an example of the level of data compression that may be achievable.

FIG. 3 shows an example of the level of data compression that may be achievable when a cycle consists of 25 frames, that is a first frame, numbered 0, followed by 24 P frames numbered 1-24. The first I frame has a data volume illustrated by column 301 that is substantially larger than the data volume of the subsequent frames, shown generally as 302. Thus, the first I frame contains a large amount of data and therefore assists in terms of compressing the size of the file by a limited extent. However, when overall data compression is the objective, the size of the first I frame may be justified given that a substantial degree of subsequent compression is achieved for the P frames.

Figure 4:
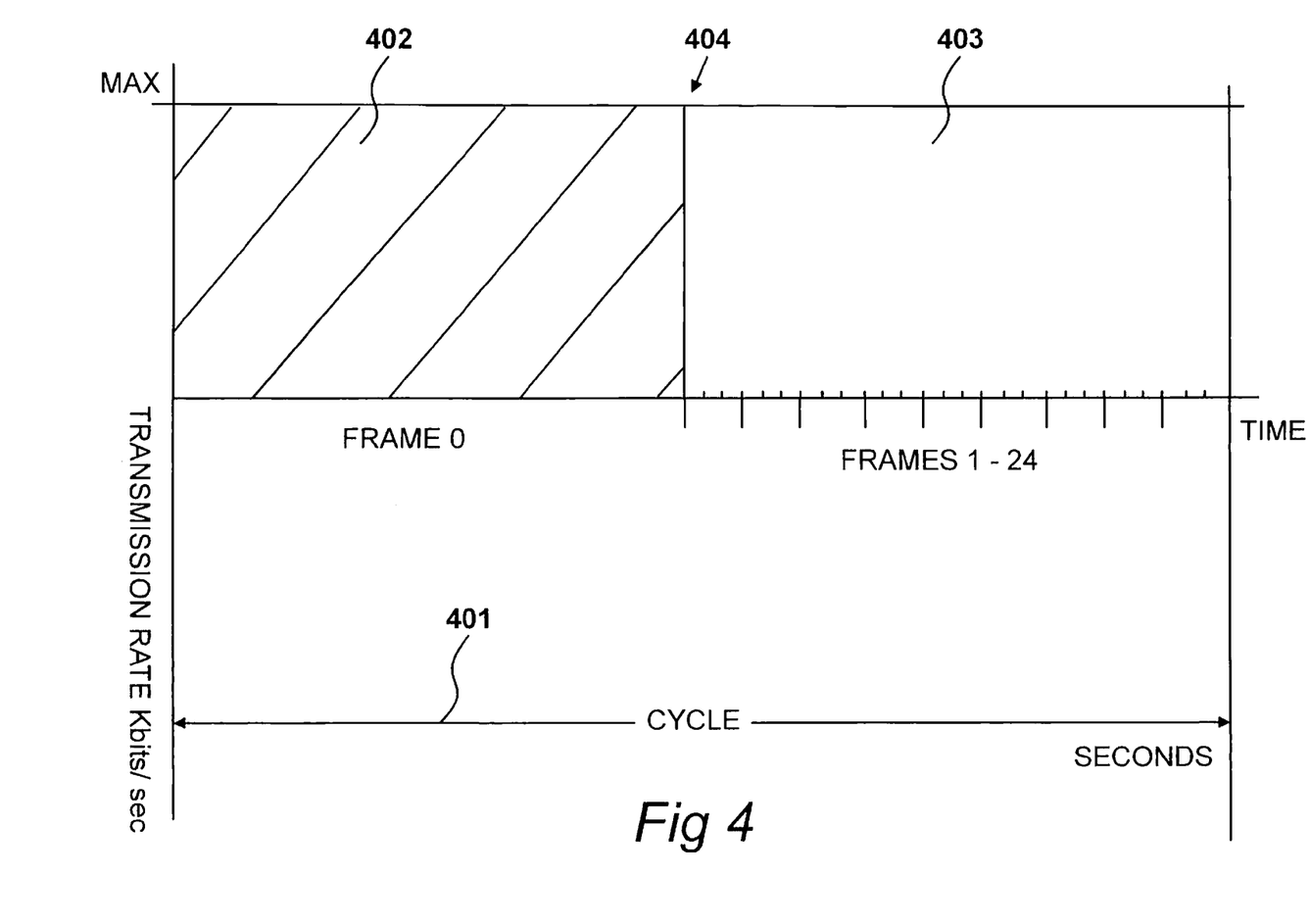
FIG. 4 illustrates the effect of streaming compressed video.

FIG. 4 illustrates the effect of streaming compressed video frames of a type having frame data volumes similar to that illustrated in FIG. 3.

Within a streaming environment it is not necessary for each frame to be transmitted at a precise time as would be the requirement within a broadcast environment. The transmitting side of the process and the receiving side of the process are both provided with buffers such that while coding may delay matters at the transmission side the decoding process may continue with respect to frames held in buffer. Similarly, if frames are being transmitted at a higher rate, these will be buffered at the receiving end. Preferably, these increases in coding and decreases in coding should be averaged out over the transmission cycle. Thus, the buffer sizes may be relatively small and it is still possible for the streaming process to continue for an indefinite period of time.

A problem with the environment illustrated in FIG. 1 is that the radio transmission between the base station 104 and the mobile devices 101 to 103 will be limited in terms of its total allocated bandwidth. Thus, irrespective of the amount of data to be transmitted, an upper bound will be placed on transmission bandwidth in terms of the number of bits that may be transmitted per unit time.

In FIG. 4, a frame cycle 401 is illustrated. Over this cycle it is necessary to transmit all 25 frames. The cycle period therefore represents a total data volume that may be transmitted in a cycle. If the transmitter attempts to transmit a larger data volume, this will result in frames being dropped and the resulting image will appear to jitter. This is considered to be an undesirable artefact therefore the coding process will provide sufficient data compression to ensure that all of the data frames may be transmitted. Furthermore and as a appreciated by the present applicant, excessive compression or less than optimum compression may result in the available bandwidth of the mobile devices not being used such that the totality of the information conveyed to a user may be less than a potential maximum. This could be perceived as quality degradation.

As illustrated in FIG. 4, the cycle starts with the transmission of frame 0. This transmission takes up all of the available bandwidth within the cycle illustrated by shaded region 402. This is then followed by an unshaded region 403 which remains available for the transmission of the remaining frames 1 to 24. Initially it would appear that a substantial portion of transmission bandwidth has been used for the transmission of a single I frame. Only approximately 60% of the cycle bandwidth has been left available for the transmission of the remaining 24 frames, in this example. However, as appreciated by the present applicant, although this would appear to be a small allocation, in reality it is an overly large allocation given that the P frames have been compressed to such a large extent that relatively little bandwidth is required in order to achieve there transmission. Portion 404 of region 403 is shown enlarged in FIG. 5.

Figure 5:
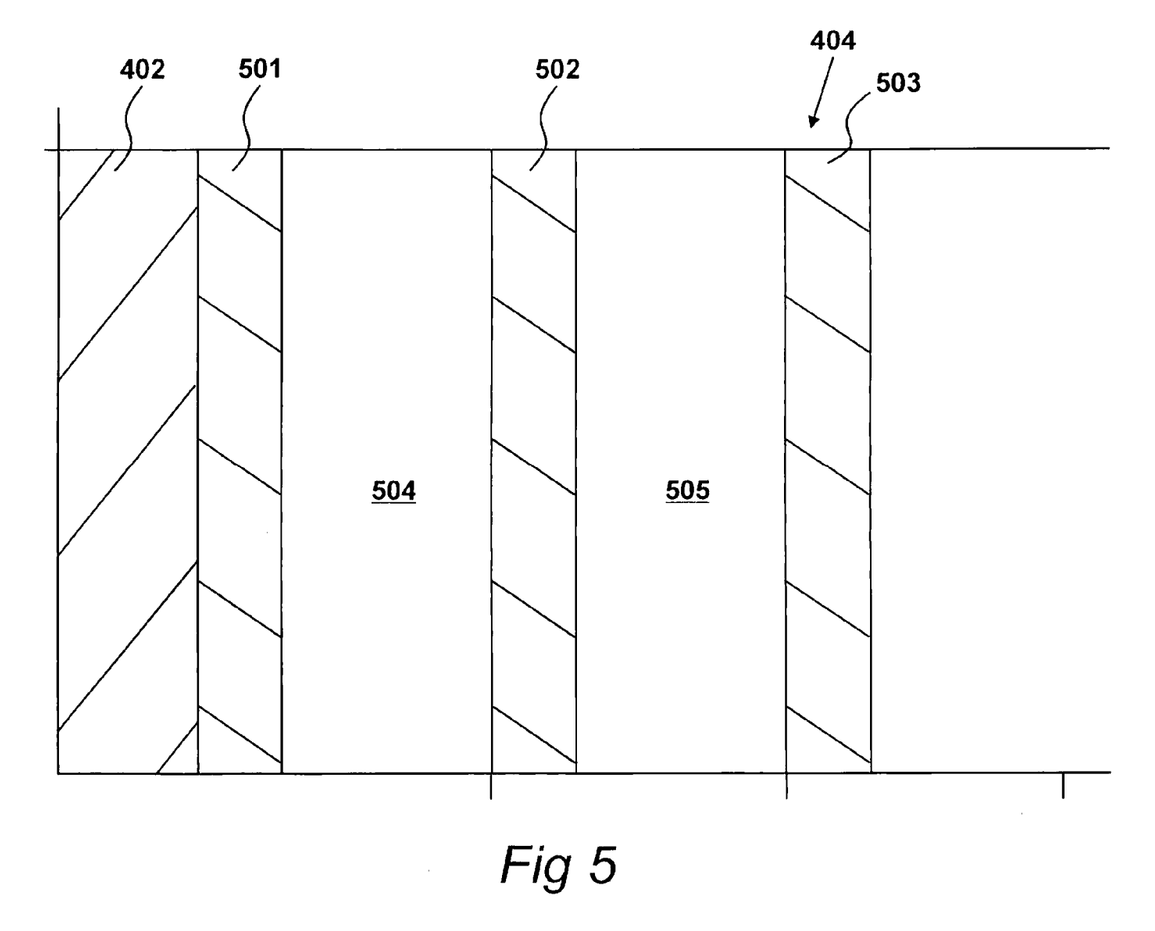
FIG. 5 shows an enlargement of the portion shown in FIG. 4.

FIG. 5, showing an enlargement of portion 404 of FIG. 4, shows just the tail end of portion 402, representing the end of the transmission of frame 0. This is then followed by the transmission of frame 1, which requires a portion of bandwidth illustrated by shaded region 501. Similarly, the transmission of frame 2 takes up available transmission bandwidth 502 and the transmission of frame 3 takes up available transmission bandwidth 503.

As illustrated in FIG. 5, the transmission of frame 1 in shaded region 501 is followed by a blank region 504 during which it would be possible to transmit more data but no more data is available until it is necessary to transmit frame 2. Again, the transmission of frame 2, taking up bandwidth 502, is then followed by a period 505, during which no data is available for transmission until the transmission of frame 3.

Thus, it can be seen from FIG. 5 that the P frames 1 to 24 have been compressed to such a large extent that they are not making full use of the transmission bandwidth available within the network.

Figure 6:
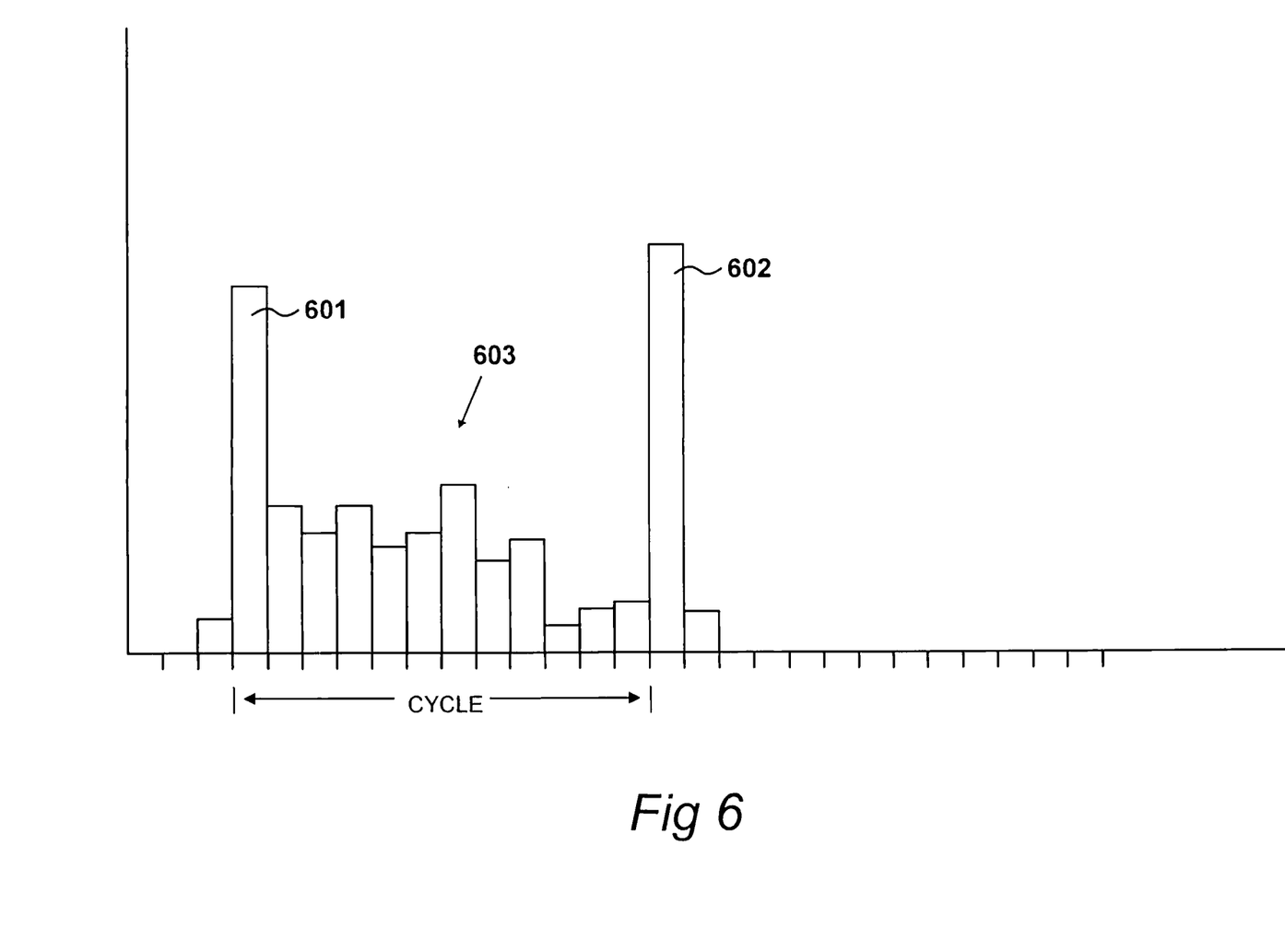
FIG. 6 illustrates an alternative coding process for coding the image frames in FIG. 2

FIG. 6 illustrates an alternative coding process for coding the image frames of FIG. 2, when compared to the coding process performed as illustrated in FIG. 3.

It is appreciated that when substantial truncation occurs, that is when processing frame 210 of FIG. 2 to frame 211, less data compression can be achieved when producing the P frames. In the example of FIG. 6, greater truncation of the I frame data has occurred therefore the I frame data volume 601 is substantially less than data volume 301. It is also appreciated that fewer P frames may be reliably produced before it is necessary to transmit the next I frame. In this example, data volume 602 represents the transmission of the next I Frame. Between these two I frames a total of eleven P frames are transmitted, each having data volumes shown in FIG. 6 and identified generally as 603. Thus, in addition to fewer P frames being transmitted, it can also be appreciated that the data volume of each P frame 603 is greater than the data volumes of P frames 302 shown in FIG. 3.

Figure 7:
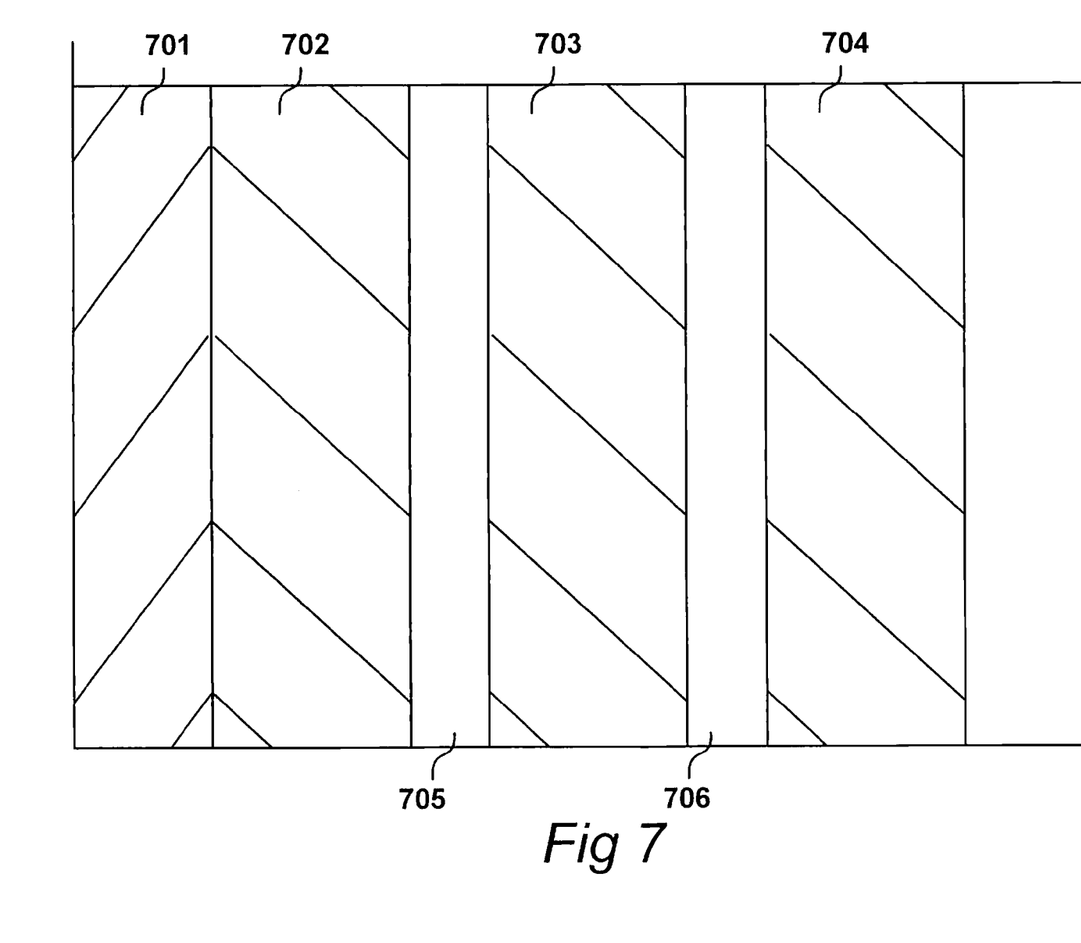
FIG. 7 shows the effect of the data volumes of FIG. 6 being transmitted over the limited bandwidth of the radio network.

FIG. 7 is substantially similar to FIG. 5 and shows the effect of data volumes of FIG. 6 being transmitted over the limited bandwidth of the radio network. Portion 701 represents the tail ends of the transmission of the I frame, requiring a data volume 601. The first P frame in the cycle is transmitted requiring a data volume illustrated by shaded region 702. Similarly, the next P frame requires a data volume illustrated by shaded region 703, followed by a bandwidth allocation for the next P frame requiring a data volume illustrated by shaded region 704. As previously described with respect to FIG. 5, blank regions 504 and 505 represented portions of allocated bandwidth that was not being used for the transmission of image data. As shown in FIG. 7, blank regions 705 and 706 are substantially smaller than 504 and 505. Optimally, these blank regions are reduced to virtually zero but in an attempt to eliminate the blank regions to zero, it is likely that some of the frames would be too large and this could then result in buffer overload and frame dropping. Consequently, a practical compromise is reached in a preferred embodiment heuristically.

Figure 8:
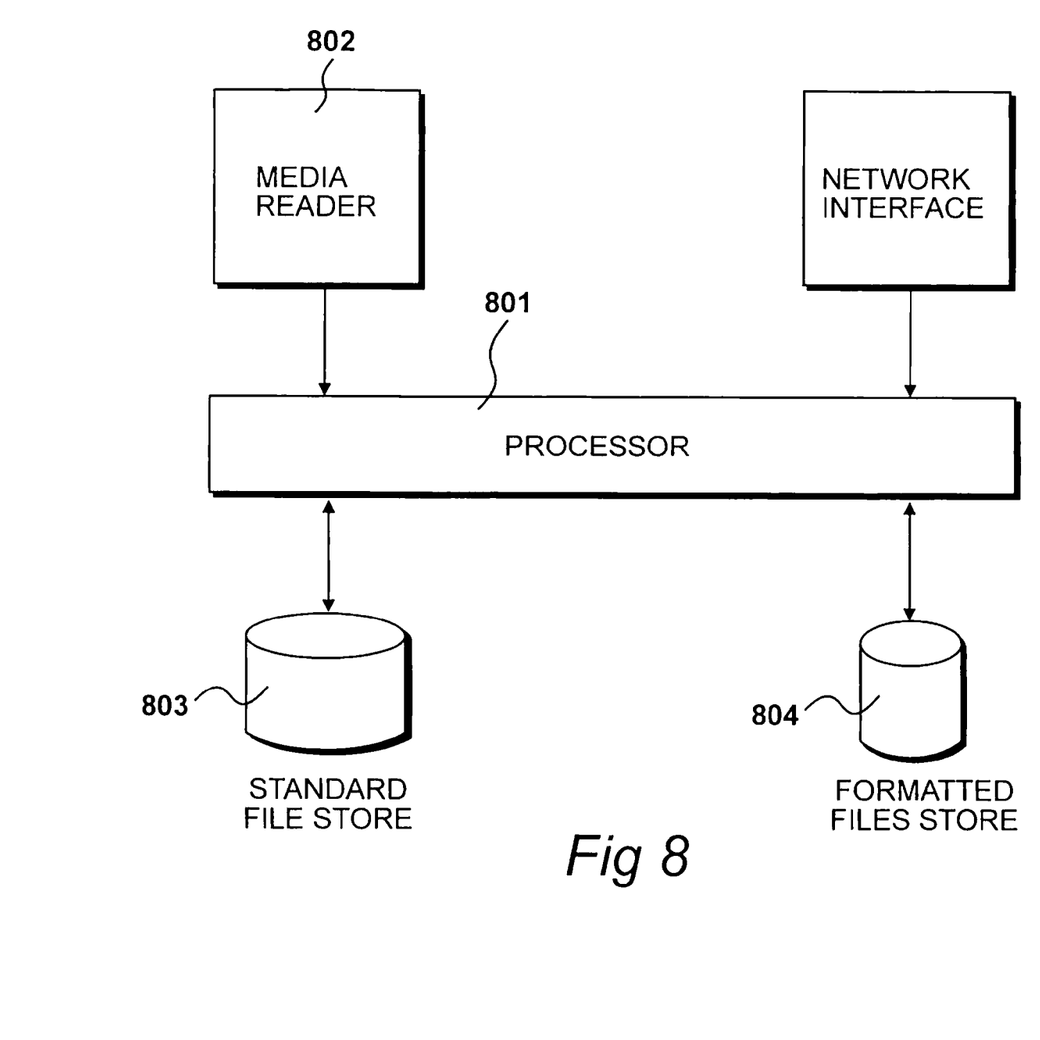
FIG. 8 illustrates a hardware platform for processing video data in accordance with a preferred embodiment of the present invention.

FIG. 8 illustrates a hardware platform for processing video data in accordance with a preferred embodiment of the present invention. A processor 801 receives input media data from a media reader 802. For each video asset a standard file is stored in a standard file store 803. The standard file may for example include images at a definition of 368×288 pixels which allows many commercial renditions to be made by an appropriate cropping process. Thus, data may be received that is compatible with the standard files or alternatively received data may be appropriately processed and recorded in the standard file store.

When implementing the preferred aspects of the present invention, the processor 801 reads a standard file from the standard file store 803 and performs a coding operation so as to create the file in accordance with a particular format. Subsequently, when a request is made for a file it is possible for a database to determine the nature of the caller and thereafter provide an appropriately formatted video asset. Furthermore, formatted files may be transferred to dedicated asset servers and multiple copies may be instantiated so as to satisfy any level of demand within the network. Locally, formatted files are written to the formatted files store 804. Typically, for streaming purposes, several different formats will be recorded in the formatted files store and therefore several coding processes will take place for each standard file.

Figure 9:
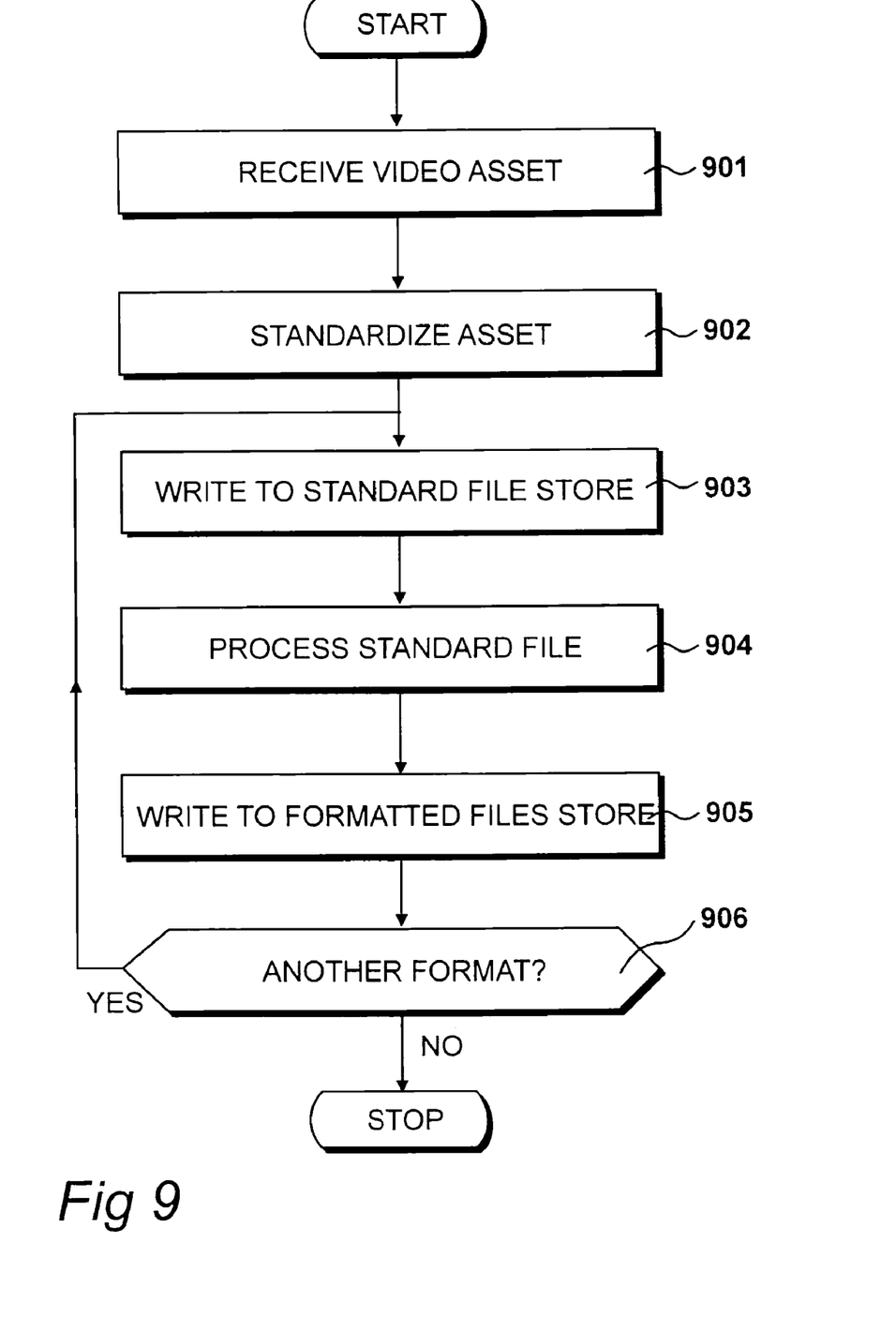
FIG. 9 illustrates processes performed by the processor shown in FIG. 8.

FIG. 9 illustrates processes performed by processor 801 in order to implement preferred aspects of the present invention.

At step 901 a video asset is received via the media reader 802 and at step 902 the asset is standardised, on the assumption that such a standardisation process is required.

At step 903 the standard file produced at step 902 is written to the standard file store 803 at step 903.

At step 904 the standard file is processed in accordance with a preferred aspect of the present invention resulting in a formatted file being written to the formatted files store at step 905.

At step 906 the question is asked as to whether another format is required and when answered in the affirmative control is returned to step 903. Eventually, all of the formats will have been produced and the process ceases.

It can therefore be seen that the procedure shown in FIG. 9 will be implemented when a new video asset is received. Furthermore, in a preferred implementation, existing standardised assets will be formatted when new formats are adopted and implemented in the field.

Figure 10:
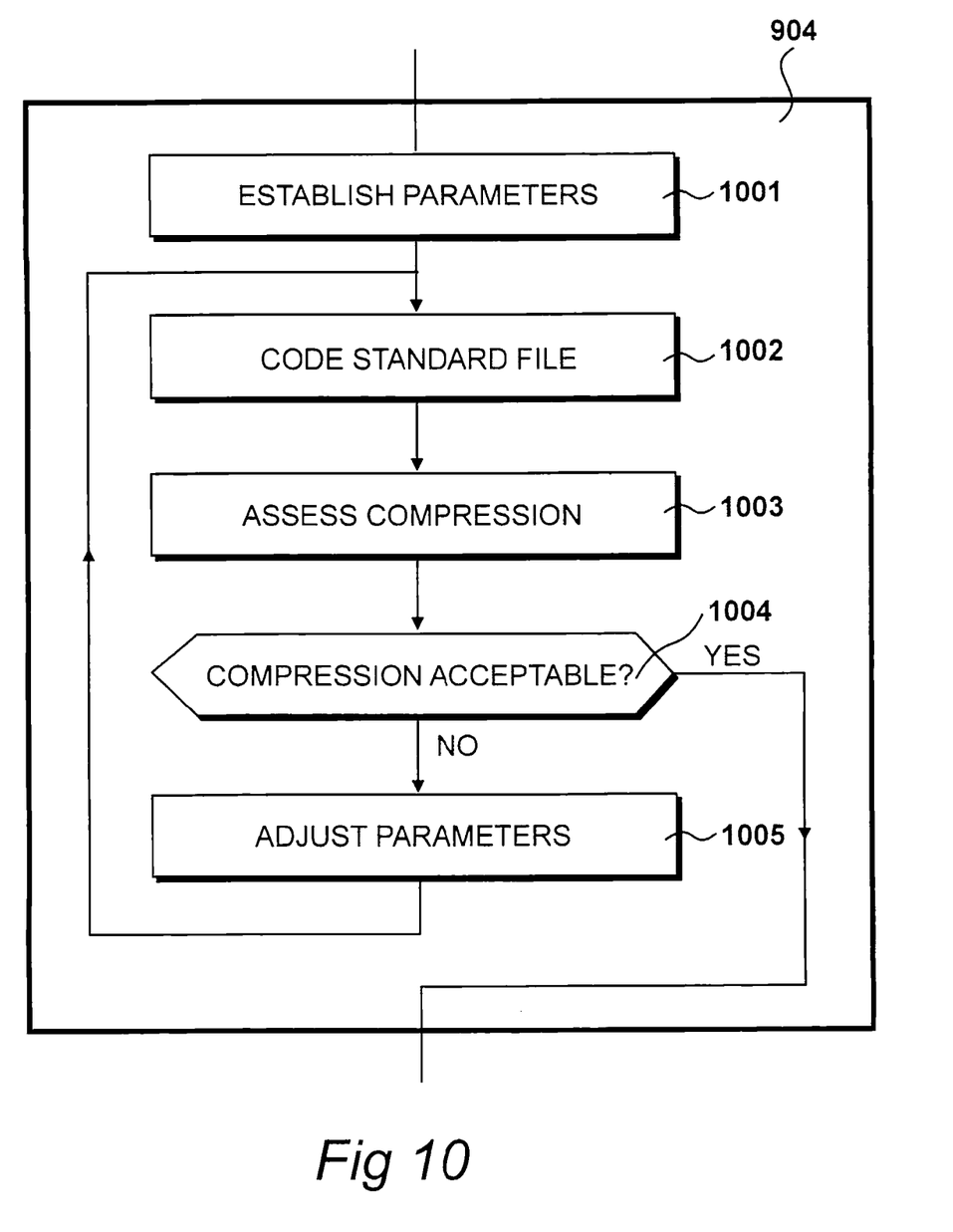
FIG. 10 details procedures for the processing of a standard file.

FIG. 10 details procedures 904 for the processing of a standard file. The processing is performed in order to allow compressed video data to be streamed to mobile devices, including mobile telephones of the type shown in FIG. 1 and other devices with mobile radio capability. The video data includes spatially compressed frames (I frames) each followed by a plurality of temporally compressed frames (P frames). A source of input video data is coded to produce compressed data having I frames and P frames. The data volume of the I frames is compared with respect to the P frames. In response to this comparison, it may be determined that the data volume of the I frames is too large when compared to the data volume of the P frames. For the purposes of this illustration, it may be assumed that a compression of the type illustrated in FIG. 3 represents a situation where the I frame (data volume 301) is too large when compared to the data volume of the P frames (302). Under these circumstances, in accordance with the preferred embodiment, the input video data is coded again to produce I frames having a smaller data volume. Thus, this re-coding may result in data volumes substantially similar to those illustrated in FIG. 6. This results in better use of the available bandwidth for transmission to the mobile devices, as illustrated in FIG. 7.

At step 1001, coding parameters are established. Thus, the selection of these parameters could result in a coding process producing data volumes of the type shown in FIG. 3 or alternatively producing data volumes of the type illustrated in FIG. 6. However, it should be emphasised that the coding performed is always compatible with a particular format and can therefore be decoded at the requesting mobile device. All procedures satisfy defined codec specifications, but adjustments to parameters are allowable within these specifications.

At step 1002 a standard file is coded in accordance with the selected codec and at step 1003 an assessment is made of the compression. Thus, in this preferred embodiment, the assessment consists of assessing whether the data volume of the I frames is too large when compared to the data volume of the P frames. Thus, in order to make this assessment, in a preferred embodiment, the average data volume of the I frames throughout the clip is compared to the average data volume of the P frames throughout the clip. In a preferred embodiment, a data volume of 10 to 1 may be considered acceptable, but if the data volume of an average I frame is more than 10 times greater than the data volume of an average P frame, this would be considered as unacceptable and modifications would be made to coding parameters in order to achieve a more optimised coding process for the purposes of streaming.

Thus, at step 1004 a question is asked as to whether the compression was acceptable, and when answered in the negative an adjustment is made to the parameters at step 1005. Control is then returned to step 1002 and the coding process is repeated.

Ultimately, the compression will be considered acceptable and the question asked at step 1004 will be answered in the affirmative. In some circumstances, the heuristic may fail to reach a preferred ratio and in order to prevent an endless loop, the number of iterations is limited. In a preferred embodiment, for example, the number of iterations may be limited to 10.

Figure 11:
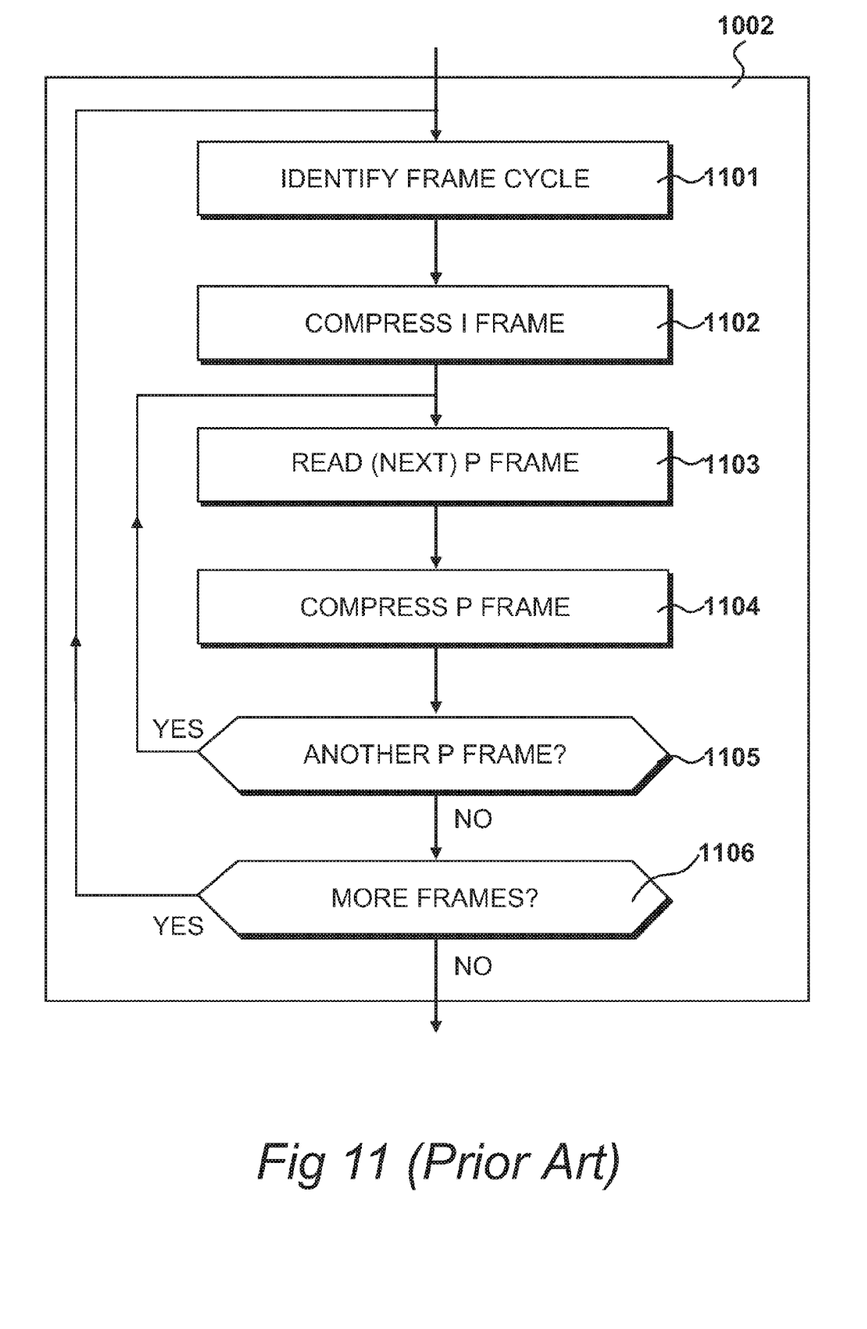
FIG. 11 illustrates an example of a known coding procedure.

FIG. 11 illustrates an example of a known coding procedure and therefore details the coding procedures performed at step 1002.

At step 1101 a frame cycle is identified, the length of which being defined by the parameters established at step 1001.

At step 1102 the I frame of a cycle is compressed to produce a frame such as I frame 211 in FIG. 2.

At step 1103 the first P frame is read, and the P frame is compressed at step 1104. As described, this compression will include spatial compression and temporal compression.

At step 1105 a question is asked as to whether another P frame is to be compressed and when answered in the affirmative the next P frame is selected at step 1103.

Having compressed all of the P frames within the cycle, the question asked at step 1105 will be answered in the negative resulting in a question being asked at step 1106 as to whether more frames are to be processed. Thus, when the question asked at step 1106 is answered in the affirmative, control is returned to step 1101 and the next frame cycle is identified.

Figure 12:
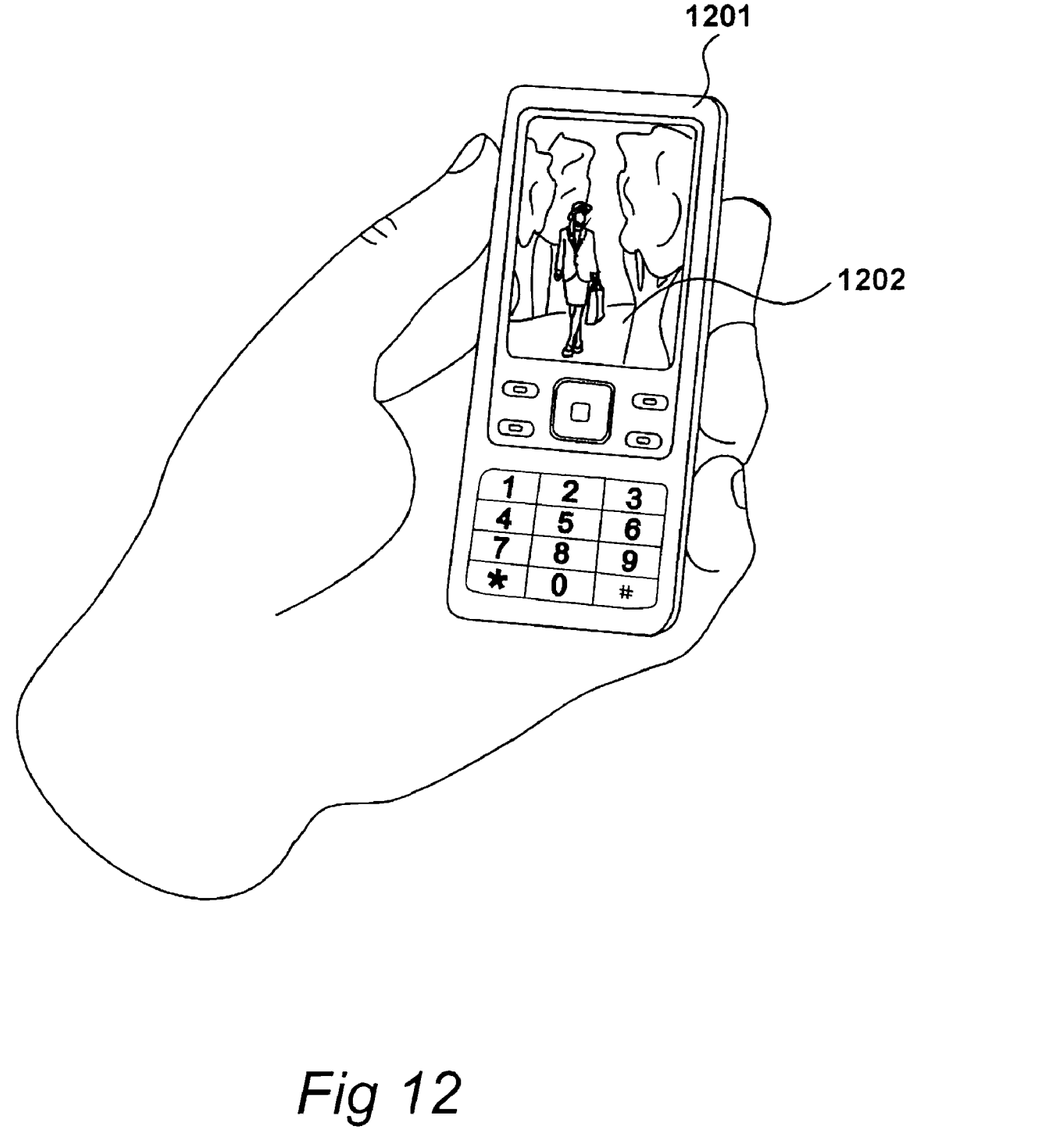
FIG. 12 illustrates the type of result that is possible when video assets are streamed to mobile phones.

FIG. 12 illustrates the type of result that is possible when video assets are streamed to mobile phones. Mobile phone, or similar mobile device. 1201 may be hand held and a video asset viewed via a display screen 1202.

What I claim is:

1. Apparatus for producing compressed video data for streaming to mobile devices, wherein said data includes spatially compressed frames (I frames) followed by a plurality of temporally compressed frames(P frames), comprising:
    a coder for coding a source of input video data to produce first compressed data having I frames and P frames;
    a comparator for comparing the data volume of the I frames to the P frames in said first compressed data to provide a data volume ratio; and
    a processing device configured to identify a preferred ratio of I frame data volume to P frame data volume, and in response to said data volume ratio being greater than said preferred ratio, recode the input data to produce second compressed data, the I frames in said second compressed data having a smaller data volume than the I frames in said first compressed data in response to the data volume of the I frames when compared to the data volume of the P frames being greater than a predetermined value,
    wherein said coding is performed again to produce I frames having a smaller data volume until the ratio of I frame data volume to P frame data volume has dropped below said preferred ratio,
    wherein the number of times in which the coding performed again is limited to a predetermined maximum, even when the ratio of I frame data volume to P frame data volume has not dropped below said preferred ratio.

2. The apparatus as claimed in claim 1, wherein said mobile devices are mobile cellular telephones.

3. The apparatus as claimed in claim 1, wherein standard files are written to a standard file storage device and files formatted from standard files are written to a formatted files storage device.

4. The apparatus as claimed in claim 3, wherein formatted files are read from said formatted files storage device and transferred to an asset server; and
    a streaming process allows streaming from said asset server to a mobile device using a real time streaming protocol.

5. A method of producing compressed video data for streaming to mobile devices, wherein said data includes spatially compressed frames (I frames) followed by a plurality of temporally compressed frames (P frames), comprising the steps of:
    identifying a preferred ratio of I frame data volume to P frame data volume;
    coding a source of input video data to produce first compressed data having I frames and P frames;
    comparing the data volume of I frames to P frames to provide a data volume ratio; and
    in response to said data volume ratio being greater than said preferred ratio, coding the input video data again to produce second compressed data, the I frames in said second compressed data having a smaller data volume than the I frames in said first compressed data,
    wherein said coding step is performed again to produce I frames having a smaller data volume until the ratio of I frame data volume to P frame data volume has dropped below said preferred ratio,
    wherein the number of times in which the coding step is performed again is limited to a predetermined maximum, even when the ratio of I frame data volume to P frame data volume has not dropped below said preferred ratio.

6. The method as claimed in claim 5, wherein said preferred ratio is between eight and fifteen to one.

7. The method as claimed in claim 5, wherein said comparing step comprises comparing the average data volume of the I frames to the average data volume of the P frames.

8. The method as claimed in claim 5, wherein coding parameters are adjusted before coding the input video data again.

9. The method as claimed in claim 8, wherein the cycle length between I frames is reduced as part of said parameter redefinition.

10. The method as claimed in claim 8, wherein the spatial compression of I frames is increased, to reduce I frame data volume, as part of said parameter adjustment.

11. The method as claimed in claim 10, wherein said spatial compression is increased by increasing the degree of truncation after transformation to the frequency domain.

12. The method as claimed in claim 5, wherein the coding process is performed for a plurality of transmission formats and protocols.

13. A non-transitory computer readable medium having stored thereon instructions executable by a computer or by a network of computers such that when executing said instructions said computer(s) will perform the steps of producing compressed video data for streaming to mobile devices, wherein said data includes spatially compressed frames (I frames) followed by a plurality of temporally compressed frames (P frames), comprising the steps of:
    coding a source of input video data to produce first compressed data having I frames and P frames;
    identifying a preferred ratio of I frame data volume to P frame data volume;
    comparing the data volume of I frames to P frames to provide a data volume ratio; and
    in response to said data volume ratio being greater than said preferred ratio, recoding the input video data to produce second compressed data, the I frames in said second compressed data having a smaller data volume than the I frames in said first compressed data,
    wherein said coding is performed again to produce I frames having a smaller data volume until the ratio of I frame data volume to P frame data volume has dropped below said preferred ratio, wherein the number of times in which the coding performed again is limited to a predetermined maximum, even when the ratio of I frame data volume to P frame data volume has not dropped below said preferred ratio.

14. The method as claimed in claim 6, in which said preferred ratio is 10 to 1.

* * * * *